United States Patent
Wijayanathan et al.

(10) Patent No.: US 9,026,132 B2
(45) Date of Patent: May 5, 2015

(54) METHODS AND APPARATUS TO PROVIDE TIME ZONE INFORMATION TO A MOBILE STATION

(75) Inventors: Maiyuran Wijayanathan, Waterloo (CA); Noushad Naqvi, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 121 days.

(21) Appl. No.: 12/883,009

(22) Filed: Sep. 15, 2010

(65) Prior Publication Data

US 2012/0064891 A1    Mar. 15, 2012

(51) Int. Cl.
*H04W 24/00* (2009.01)
*H04W 60/00* (2009.01)
*H04W 4/02* (2009.01)
*H04W 4/20* (2009.01)

(52) U.S. Cl.
CPC .............. *H04W 60/00* (2013.01); *H04W 4/021* (2013.01); *H04W 4/028* (2013.01); *H04W 4/20* (2013.01)

(58) Field of Classification Search
USPC ............. 455/422.1, 435.1, 456.1, 457, 181.1, 455/244.1
See application file for complete search history.

(56) References Cited

U.S. PATENT DOCUMENTS

| | | | |
|---|---|---|---|
| 6,414,635 B1 | 7/2002 | Stewart et al. | |
| 2002/0098857 A1* | 7/2002 | Ishii | 455/502 |
| 2004/0203620 A1* | 10/2004 | Thome et al. | 455/412.1 |
| 2006/0252438 A1* | 11/2006 | Ansamaa et al. | 455/503 |
| 2008/0025258 A1* | 1/2008 | Lefevre et al. | 370/330 |
| 2008/0032736 A1 | 2/2008 | Bari et al. | |
| 2008/0081612 A1 | 4/2008 | Seo et al. | |
| 2009/0176479 A1* | 7/2009 | Vikberg et al. | 455/406 |
| 2009/0196268 A1* | 8/2009 | Caldwell et al. | 370/338 |

FOREIGN PATENT DOCUMENTS

WO    2007096685 A1    8/2007

OTHER PUBLICATIONS

3rd Generation Partnership Project; Technical Specification Group Services and System Aspects; Network Identity and Timezone (NITZ); Service description, Stage 1; Release 9; Document No. 3GPP TS 22.042 V9.0.0, Dec. 2009 (8 pages).
3rd Generation Partnership Project; Technical Specification Group Core Network and Terminals; NTechnical realization of the Short Message Service (SMS); Release 9; Document No. 3GPP TS 23.040 V9.2.0, Mar. 2010 (202 pages).
3rd Generation Partnership Project; Technical Specification Group GSM/EDGE Radio Access Network; Generic Access Network (GAN); Stage 2; Release 8; Document No. 3GPP TS 43.318 V8.4.0, Feb. 2009 (127 pages).
3rd Generation Partnership Project; Technical Specification Group GSM/EDGE Radio Access Network; Generic Access Network (GAN); Mobile GAN interface layer 3 specification; Release 8; Document No. 3GPP TS 44.318 V8.7.0, Mar. 2010 (246 pages).

(Continued)

*Primary Examiner* — Rafael Pérez-Gutiérrez
*Assistant Examiner* — Thai Vu
(74) *Attorney, Agent, or Firm* — Fish & Richardson P.C.

(57) ABSTRACT

Methods and apparatus for providing time zone information to a mobile station are described. An example method disclosed herein includes accepting at a generic access network controller a registration request from a mobile station, encoding in a generic access network information element a first offset from a first time, and transmitting the generic access network information element to the mobile station.

12 Claims, 8 Drawing Sheets

(56) References Cited

OTHER PUBLICATIONS

Digital cellular telecommunications system (Phase 2+); Generic Access Network (GAN); Mobile GAN interface layer 3 specification; Release 9; Document No. 3GPP TS 44.318 version 9.2.0, Mar. 2010 (248 pages).

3rd Generation Partnership Project; Technical Specification Group Core Network and Terminals; Mobile radio interface Layer 3 specification; Core network protocols; Stage 3; Release 9; Document No. 3GPP TS 24.008 version 9.3.0, Jun. 2010 (611 pages).

3rd Generation Partnership Project, 3GPP TSG-CT WG1 Meeting #66, "Discussion on Timezone Info in MM Information Procedure," C1-103166, Xi'an (P.R. China), Aug. 23-27, 2010 (5 pages).

3rd Generation Partnership Project, 3GPP TSG CT Meeting #49, "Change Request," CP-100524, San Antonio, US, Jul. 2010 (3 pages).

International Searching Authority, "Notification of Transmittal of The International Search Report and The Written Opinion of The International Searching Authority, or The Declaration", issued in connection with International Application No. PCT/CA2011/050564, Dec. 16, 2011, (10 pages).

Global System for Mobile Communications, Digital Cellular Telecommunications System (Phase 2+); Generic Access Network (GAN); Stage 2 (3GPP TS 43.318 version 9.0.0 Release 9), Feb. 2010, (128 pages).

Global System for Mobile Communications, Digital Cellular Telecommunications System (Phase 2+); Generic Access Network (GAN); Mobile GAN Interface Layer 3 Specification (3GPP TS 44.318 version 9.2.0 Release 9), Mar. 2010, (248 pages).

International Bureau, "International Preliminary Report on Patentability", issued in connection with PCT/ CA2011/050564, mailed Mar. 28, 2013 (7 pages).

Canadian Intellectual Property Office, "Office Action", issued in connection with corresponding Canadian Patent Application No. 2,775,127 dated Feb. 6, 2014 (2 pages).

* cited by examiner

METHODS AND APPARATUS TO PROVIDE TIME ZONE INFORMATION TO A MOBILE STATION

FIELD OF THE DISCLOSURE

This disclosure relates generally to mobile communications and, more particularly, to methods and apparatus to provide time zone information to a mobile station.

BACKGROUND

Network identification and time zone (NITZ) is a cellular network feature that provides time information to a mobile station (MS). In 2G and 3G networks, NITZ is accomplished by sending messages including time information to the MS. However, the messages including time information are optional. Accordingly, it may be impossible for a MS to correctly set its time.

Mobile devices are often equipped with applications for keeping track of time-dependent events, such as calendars, meetings, alarms, clocks, etc. Many of these applications use a clock that is updated by the mobile device. If the clock is incorrect, the applications that rely on the clock may not function properly. For example, a user of the mobile device may miss a meeting that was scheduled in an application for a particular time if the clock does not provide the necessary alert, which is programmed to alert the user at a particular time, at the correct time.

DETAILED DESCRIPTION

Figure 1:
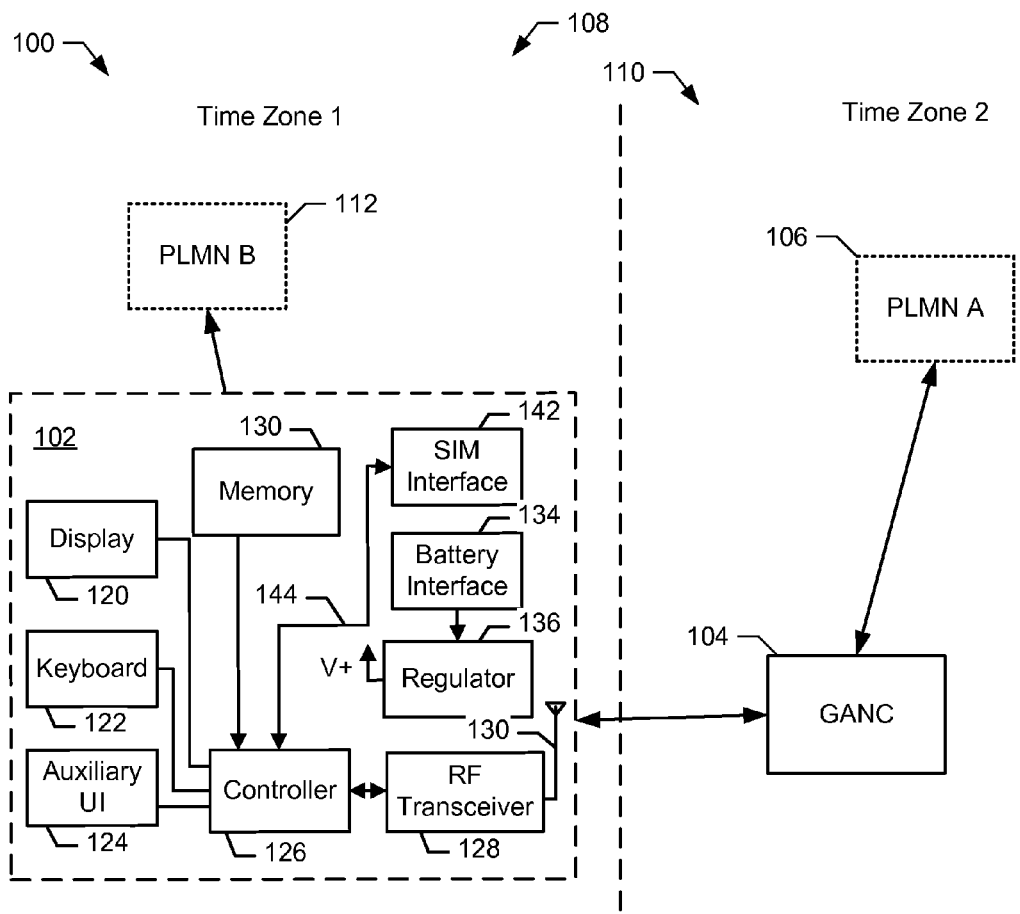
FIG. 1 is a block diagram of an example communication system to provide time zone information to a mobile station.

Methods and apparatus for providing time zone information to a mobile station are described. An example method disclosed herein includes accepting at a generic access network controller a registration request from a mobile station, encoding in a generic access network information element a first offset from a first time, and transmitting the generic access network information element to the mobile station.

In some implementations, the method further includes encoding a universal time at which the generic access network information element is transmitted. In some implementations, the first time is coordinated universal time (UTC). In some implementations, the first offset is a local time zone relative to UTC.

In some implementations of the method, the registration request from the mobile station includes at least one of a cellular radio access network identity, an access point location, or a geographic location. In some such implementations, the method further includes determining first offset based on the registration request. In some implementations, the method further includes determining at least one of a local time zone or the first offset based on at least one of the cellular radio access network identity, the access point location, the geographic location, or an outer Internet protocol address of an Internet protocol security tunnel connecting the generic access network controller to the mobile station.

In some example implementations, the method further includes providing to the mobile station a mobility manager information element generated by a public land mobile network, the mobility manager information element a second offset from the first time. In some such implementations, the first offset is to be used by the mobile station to determine a local time instead of the second offset. In some implementations, wherein the generic access network information element includes at least an information element identifier field, an hour field, a minute field, a second field, and a time zone field. In some such implementations, the time zone field includes the encoded first offset.

Another example method disclosed herein includes sending a generic access network registration request from a mobile station to a generic access network controller, receiving a generic access network registration acceptance comprising an information element that includes a first offset from a first time, receiving a second offset from the first time sent by a public land mobile network, and selecting the information element instead of the second offset when connected to the generic access network controller.

In some implementations, the generic access network registration acceptance is a first universal time. In some such implementations, the method further includes receiving a second universal time from the public land mobile network, and selecting the first universal time when connected to the generic access network controller.

In some implementations, the method further includes determining a local time based on the first universal time and the first offset. In some implementations, the generic access network registration request includes at least one of a cellular radio access network identity, an access point location, or a geographic location. In some implementations, the first offset is determined by the generic access network controller based on the generic access network registration request. In some implementations, the first offset is determined by determining at least one of a first time zone or the first offset based on at least one of the cellular radio access network identity, the access point location, the geographic location, or an outer Internet protocol address of an Internet protocol security tunnel connecting the generic access network controller to the mobile station.

Another example method described herein includes accepting at a generic access network controller a registration request from a mobile station, determining a location of the mobile station from at least one of a cellular radio access network identity, an access point location, a geographic location, or an Internet protocol address associated with a security tunnel connecting the generic access network controller and the mobile station, and sending at least one of the location or a time zone associated with the location to a public land mobile network serving the mobile station for providing the mobile station with a local time zone.

Also described herein are methods, computer readable media storing instructions, and apparatus that may implement the foregoing mobile stations, processes performed by the mobile stations, generic access network controllers, and processes performed by the generic access network controllers.

FIG. 1 is a block diagram of an example communication system 100 implemented as described herein to provide time zone information to a mobile station 102. According to the illustrated example, a mobile station 102 is communicatively coupled with a generic access network (GAN) controller (GANC) 104. In some examples, the mobile station 102 and the GANC 104 may be connected via an access point (AP) and/or an internet protocol (IP) based network, which are omitted from FIG. 1 to enhance clarity. The GANC 104 communicatively couples the mobile station 102 to a public land mobile network (PLMN) (e.g., PLMN A 106). In particular, the GANC 104 facilitates circuit switched (CS) and packet switched (PS) communications between the mobile station 102 and the PLMN A 106. When the mobile station 102 is not coupled to the GANC 104, the mobile station 102 receives Time Zone and Time information from another PLMN (e.g., PLMN B 112, a macro network) via a GERAN or UTRAN base station, which correctly determines the physical location of the mobile station 102 as time zone 1 108. Because the mobile station 102 is connected to the GANC 104 through an IP network, the mobile station 102 may connect remotely to the GANC 104 from any location where Internet access is available. Occasionally, the mobile station 102 and the GANC 104 may be physically located in different time zones. As illustrated in FIG. 1, the mobile station 102 is located in time zone 1 108 and the GANC 104 and the PLMN A 106 are located in time zone 2 110. While FIG. 1 depicts multiple PLMNs 1 and 2 106, 112, the PLMNs 1 and 2 106, 112 and the GANC 104 may be administered by the same operator.

The PLMN B 112 and the PLMN A 106 are core networks that provide communication services for mobile stations, such as the mobile station 102, via an access network such as a GAN or a base station. The PLMNs 1 and 2 106, 112 may each be any type of network that provides any combination of CS and PS services for mobile stations such as, for example, a 2G network, a 3G network, a fourth generation (4G) network, a Global Systems for Mobile (GSM) technologies network, a universal mobile telecommunications system (UMTS) network, a long term evolution (LTE) network, a code division multiple access (CDMA) network, etc. For example, the PLMN A 106 may be communicatively coupled to the mobile station 102 via the GANC 104 or via a base station antenna (not shown). The PLMN B 112 may be identical to or different from the PLMN A 106. The example PLMN B 112 includes a core network and an access network (e.g., a base station) (not shown) to connect to the mobile station 102.

When the mobile station 102 registers for communication with the GANC 104, the GANC 104 sends a message indicating acceptance of the registration. As described below in detail, the message transmitted by the GANC 104 includes Time Zone and Time information corresponding to the physical location of the mobile station 102 (e.g., the local time and the local time zone of the physical location of the mobile station 102). Once connected to the PLMN A 106 via the GANC 104, the mobile station 102 also receives Time Zone and Time information from the PLMN A 106. However, the Time Zone and Time information generated by the PLMN A 106 may be based on the cell identification the mobile station 102 indicates to PLMN A 106 when connected to PLMN A 106 via the GANC 104 and may not necessarily be representative of the location of the mobile station 102. Accordingly, to provide the mobile station 102 accurate local Time Zone and Time information, the GANC 104 determines the local time zone of the mobile station 102 using its knowledge of the physical location of the mobile station 102. When connected to the GANC 104, the mobile station 102 may use the Time Zone and Time information received from the GANC 104, instead of using Time Zone and Time information received from the PLMN A 106, to determine a local time and local time zone. Advantageously, because the GANC 104 knows the approximate physical location of the mobile station 102, the GANC 104 provides the mobile station 102 with accurate Time Zone and Time information. When the mobile station 102 is no longer connected to the GANC 104, the mobile station 102 receives and uses accurate Time Zone and Time information from the PLMN B 112. If the mobile station 102 used the PLMN A 106 Time Zone and Time information when connected to the GANC 104, the clock may change repeatedly between time zones as the mobile station 102 connects and disconnects from the GANC 104 to the PLMN B 112.

As shown in one example in FIG. 1, the mobile station 102 includes a visual display 120, a keyboard 122, and perhaps one or more auxiliary user interfaces (UI) 124, each of which are coupled to a controller 126. The controller 126 is also coupled to a radio frequency (RF) transceiver circuitry 128, which is further coupled to an antenna 130. In one example, the controller 126 is implemented using a central processing unit (CPU) that runs operating system software stored in a memory 130. The controller 126 will normally control overall operation of mobile station 102, whereas signal processing operations associated with communication functions are typically performed by the RF transceiver circuitry 128. The controller 126 interfaces with the display 120 to present received information, stored information, user inputs, and the like.

The keyboard 122, which may be a telephone type keypad or full alphanumeric keyboard, is normally provided for entering data for storage in the mobile station 102, information for transmission to the network, such as the PLMN B 112, the GANC 104, the PLMN A 106, etc. Such data may include a telephone number to place a telephone call, commands to be executed on the mobile station 102, and possibly other or different user inputs.

The mobile station 102 sends communication signals to and receives communication signals from the GANC 104 and/or the PLMN B 112 over a wireless link via the antenna 130. The RF transceiver circuitry 128 performs, for example, modulation/demodulation, encoding/decoding, and encryption/decryption. The RF transceiver circuitry 128 is adapted to particular wireless network or networks in which mobile station 102 may operate.

The mobile station 102 further includes a battery interface 134 to receive one or more rechargeable batteries (not shown) that provide power to electrical circuitry in mobile station 102. The battery interface 134 provides for a mechanical and electrical connection for the battery. The battery interface 134 is coupled to a regulator 136 that regulates power V+ to the device. When the mobile station 102 is operational, an RF transmitter of the RF transceiver circuitry 128 is typically keyed or turned on only when it is sending information to the network, and is otherwise turned off to conserve resources. Similarly, an RF receiver of the RF transceiver circuitry 128 is typically periodically turned off to conserve power until it is needed to receive signals or information (if at all) during designated time periods.

The mobile station 102 operates using a Subscriber Identity Module (SIM) (not shown) that is connected to or inserted in the mobile station 102 at a SIM interface 142. Without the SIM, the mobile station 102 may be referred to as mobile equipment (ME). The SIM is one type of a removable memory module or smart card used to identify an end user of mobile station 102 (or subscriber) and to personalize the device, among other things. Without the SIM, the example mobile station 102 is not fully operational for communication. By inserting the SIM into the mobile station 102, an end user can have access to any and all of his/her subscribed services.

The SIM generally includes a processor and memory for storing information. Because the SIM is coupled to the SIM interface 142, it is coupled to the controller 126 through communication lines 144. To identify the subscriber, the SIM contains some user parameters such as an International Mobile Subscriber Identity (IMSI). An advantage of using the SIM is that end users are not necessarily bound by any single physical mobile station because the SIM may be used in any number of different mobile stations. The SIM may store additional user information for the mobile station 102 as well, including datebook (or calendar) information, recent call information, and network connection information.

The mobile station 102 may be a single unit, such as a data communication device, a cellular telephone, a multiple-function communication device with data (e.g., electronic mail, internet access, personal information management, etc.) and voice communication capabilities, a personal digital assistant (PDA) enabled for wireless communication, or a computer incorporating an internal modem. Alternatively, the mobile station 102 may be a multiple-module unit comprising a plurality of separate components, including but in no way limited to a computer or other device connected to a wireless modem. In particular, for example, in the mobile station block diagram of FIG. 1, the RF transceiver circuitry 128 and antenna 130 may be implemented as a radio modem unit that may be inserted into a port on a laptop computer. In this case, the laptop computer would include the display 120, keyboard 122, one or more auxiliary UIs 124, and the controller 126 may be the computer's CPU. A computer or other equipment not normally capable of wireless communication may be adapted to connect to and effectively assume control of the RF transceiver circuitry 128 and the antenna 130 of a single-unit device such as one of those described above.

The example mobile station 102 includes functionality to receive a registration acceptance that includes Time Zone and Time information from the GANC 104, which may be received, for example, as part of a registration procedure. The example mobile station 102 also includes functionality to receive a registration downlink update that includes Time Zone and Time information from the GANC 104. In general, the registration acceptance and the registration downlink update are referred to herein as registration messages. In some examples, the mobile station 102 may extract, decode, decrypt, or otherwise receive an information element that may be included with, inserted in, embedded in, or otherwise associated with the registration message. In addition, the mobile station 102 is capable of recognizing the Time Zone and Time information from the GANC 104 and determining a local time from the information. For example, the mobile station 102 may receive the registration message, read an information element that includes an encoded offset between the local time zone and universal time (e.g., UTC) and the approximate hour, minute, and second the registration message was transmitted.

The mobile station 102 of the illustrated example may connect to the GANC 104 through any type of GAN access point, unlicensed mobile access (UMA) access point, home node B, femtocell, etc. For example, the mobile station 102 may connect via a Wi-Fi IEEE 802.11 access point, a worldwide interoperability for microwave access point (WiMax) IEEE 802.16 access point, a Bluetooth™ access point, etc.

Figure 2:
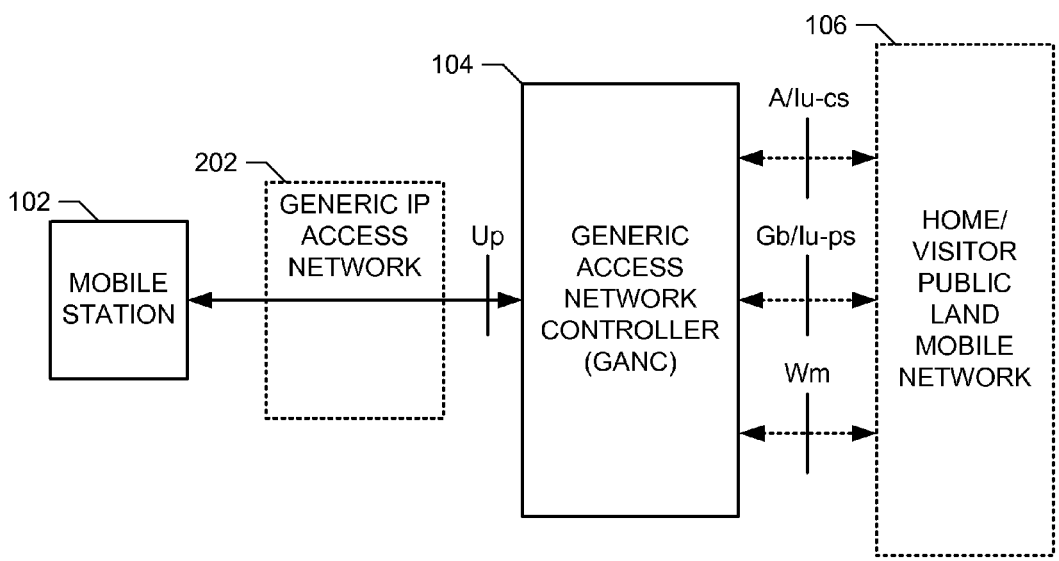
FIG. 2 is a block diagram of an example connection path between a mobile station and a public land mobile network via a generic access network controller.

FIG. 2 is a block diagram illustrating an example connection path between the mobile station 102 and the PLMN A 106 via the GANC 104 of FIG. 1. The example mobile station 102 is communicatively coupled to the GANC 104 via a generic Internet protocol (IP) access network 202 using an Up interface.

The generic IP access network 202 of the illustrated example is the Internet. In other examples, the generic IP access network 202 may be any type of private network that communicatively couples the mobile station 102 to the GANC 104. For example, the public network may be any type of public or private local area network, wide area network, wireless network, wired network, etc.

The GANC 104 provides transparent access by the mobile station 102 to the PLMN A 106. The mobile station 102 connects to the GANC 104, which converts data sent via the Up interface to use the A interface, the Gb interface, and/or the Wm interface. Additionally or alternatively, the GANC 104 may convert the data to use the Iu-cs interface, the Iu-ps interface, and the Wm interface.

Figure 3:
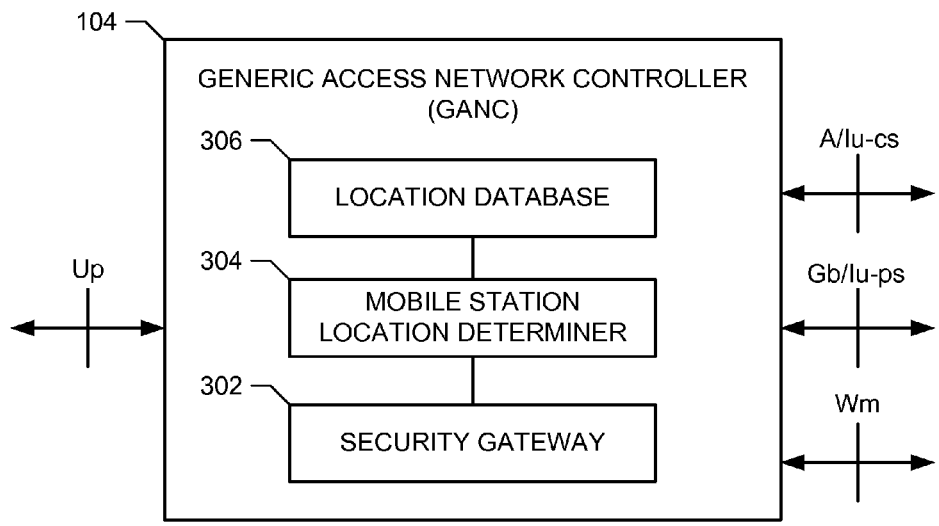
FIG. 3 is a more detailed block diagram of the example generic access network controller of FIG. 1.

FIG. 3 is a more detailed block diagram of the example GANC 104 of FIG. 1. The example GANC 104 of FIG. 3 includes a security gateway 302, a mobile station location determiner 304, and a location database 306. The security gateway 302 establishes an IPSec security tunnel to connect to the mobile station 102. In addition to the security gateway 302 and other standard GANC 104 functionality, the example GANC 104 of FIG. 2 includes the mobile station location determiner 304 and the location database 306 to provide Time Zone and Time information to a mobile station 102. For example, the mobile station location determiner 304 receives information from the mobile station 102 and/or from the security gateway 302 in conjunction with a registration request. The mobile station location determiner 304 accesses the location database 306 (e.g., performs a database lookup) to determine a physical location or an approximate physical location of the mobile station 102. As described in more detail below, the mobile station 102 may provide one or more of a geographic location, an AP location, and/or a cellular radio access network identity (e.g., a cell global identity (CGI) for a nearby macro cell, a background UTRAN or GERAN cell). Additionally or alternatively, the mobile station location determiner 304 may receive an outer IP address for the IPSec tunnel through which the mobile station 102 is connected to the security gateway 302.

The example location database 306 may include mappings of geographical locations to time zones, AP locations to time zones, cellular radio access network identity, and/or IP addresses to time zones. The mappings may include any indication of time zone, such as an offset between the time zone and universal time (e.g., +1:00 UTC, −8:00 UTC, etc.). While the example location database 306 is shown as included in the GANC 104, the location database 306 may be external to the GANC 104. When the mobile station location determiner 304 receives information about a location of the mobile station 102 from the mobile station 102 (e.g., via a received registration request) and/or from the security gateway 302, the mobile station location determiner 304 may perform a lookup of the information in the location database 306 to determine a time zone in which the mobile station 102 is located. The time zone may then be provided to the mobile station 102 as a part of, for example, a registration acceptance (e.g., a GA-RC REGISTER ACCEPT message).

Figure 4:
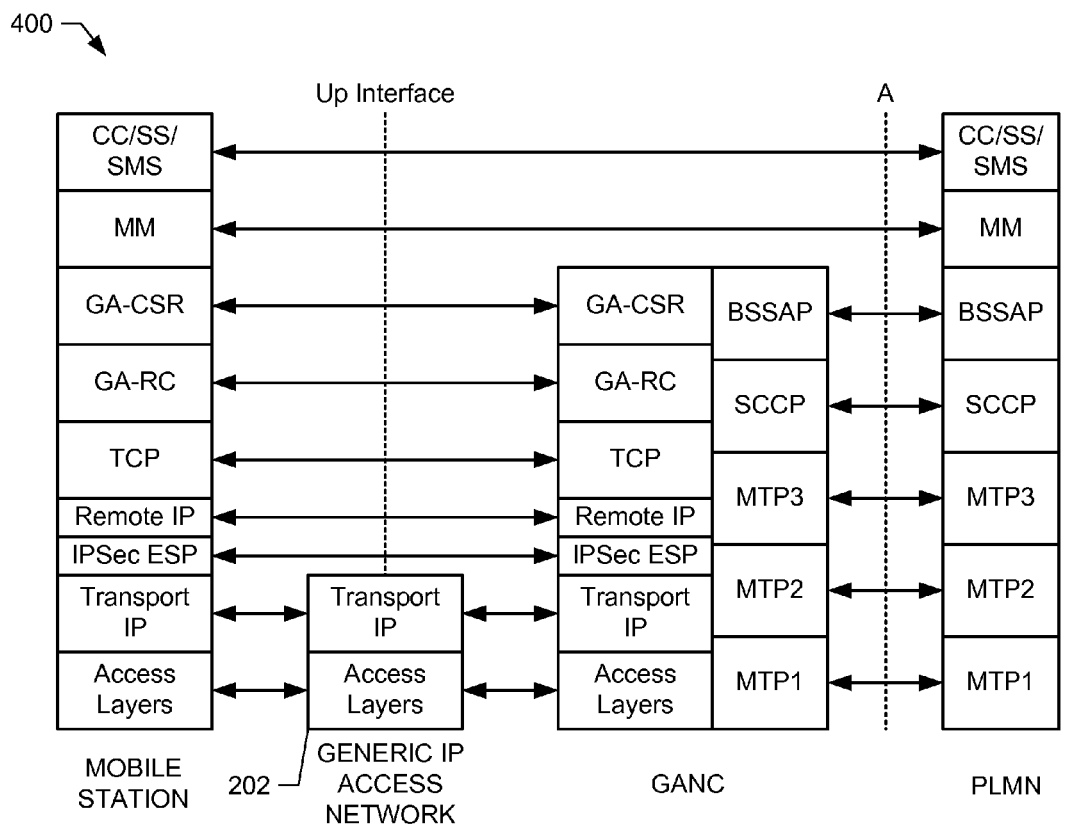
FIG. 4 illustrates an example layered interface between a mobile station and a public land mobile network.

FIG. 4 illustrates an example layer interface 400 between the mobile station 102 and the PLMN A 106 of FIG. 1. The layer interface 400 may be used to transport and support communications between the mobile station 102 and the PLMN A 106. The example layer interface 400 includes the GANC 104 and the generic IP network 204 of FIG. 2. The generic IP network 204 supports the access layers and the transport IP layer to provide generic IP connectivity between the mobile station 102 and the GANC 104. As described above, the generic IP network 204 may be any generic IP network that provides Internet access to the mobile station 102.

The IPSec ESP layer provides encryption and data integrity between the mobile station 102 and the GANC 104. TCP provides reliable transport for the GA-RC between the mobile station 102 and the GANC 104, and is transported via the Remote IP layer. The GA-RC manages the IP connection, including GAN registration procedures such as exchanging the GA-RC REGISTER REQUEST message and the REGISTER ACCEPT message. The GA-CSR includes functionality equivalent to the GSM-RR protocol, using the underlying connection managed by the GA-RC.

The GANC 104 carries mobility manager (MM), call control (CC), switching service (SS), and short message service (SMS) protocols, among others, transparently between the mobile station 102 and the PLMN A 106. The GANC 104 also terminates the GA-CSR protocol and inter-works GA-CSR messages to the A interface for messaging to the PLMN A 106 via BSSAP messaging. The Remote IP layer is the inner IP layer for IPSec tunnels, and is used by the mobile station 102 to be addressed by the GANC 102. The Remote IP layer is configured during establishment of the IPSec connection between the mobile station 102 and the GANC 104.

While the example interface 400 of FIG. 4 shows an Up-A/Gb CS interface, the example interface 400 may additionally or alternatively include an Up-A/Gb PS interface, an Up-Iu-cs interface, and/or an Up-Iu-ps interface, which are described in the 3GPP TS 43.318 standard, the entirety of which is hereby incorporated by reference.

Figure 5:
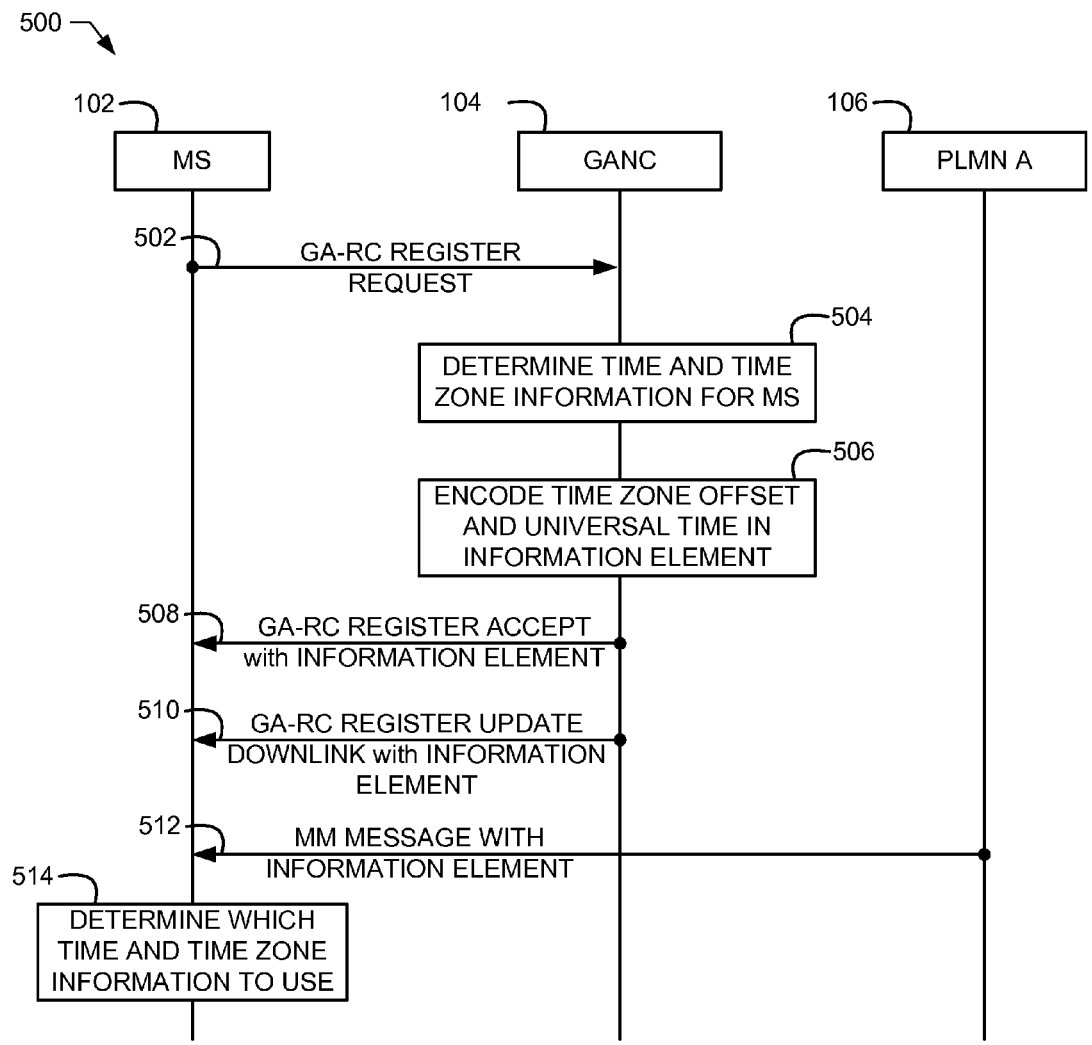
FIG. 5 is an example message flow to provide a mobile station with time zone information.

FIG. 5 is an example message flow 500 that may occur to provide the mobile station 102 of FIG. 1 with Time Zone and Time information. The message flow 500 occurs between the mobile station 102, the GANC 104, and the PLMN A 106 of FIG. 1. The example message flow 500 begins when the mobile station 102 is to initiate communication with the GANC 104 to, for example, request registration and/or access to the PLMN A 106 via the GANC 104. The mobile station 102 sends a registration request (e.g., a GA-RC REGISTER REQUEST message 502) to the GANC 104. For example, a GA-RC REGISTER REQUEST message 502 may be sent in accordance with 3GPP TS 44.318, the entirety of which is hereby incorporated by reference. Table 1 illustrates an example format for a GA-RC REGISTER REQUEST message 502.

TABLE 1

Content of GA-RC REGISTER REQUEST message

| IEI | Information Element | Type/Reference | Presence | Format | Length | Value | Notes |
|---|---|---|---|---|---|---|---|
|  | Length Indicator | Length Indicator 11.1.1.1 | M | V | 2 |  |  |
|  | GA-RC Protocol Discriminator | Protocol Discriminator 11.1.1.2 | M | V | ½ | 0 |  |
|  | Skip Indicator | Skip Indicator 11.1.1.3 | M | V | ½ | 0 |  |
|  | GA-RC REGISTER REQUEST message identity | Message Type 11.1.1.4 | M | V | 1 |  |  |
| 1 | IMSI | Mobile Identity 11.2.1 | M | TLV | 10 |  |  |
| 2 | GAN Release Indicator | GAN Release Indicator 11.2.2 | M | TLV | 3 |  |  |
| 7 | GAN Classmark | GAN Classmark 11.2.7 | M | TLV | 4 |  |  |
| 3 | AP Radio Identity | Radio Identity 11.2.3 | C | TLV | 9-n |  |  |
| 96 | MS Radio identity | Radio Identity 11.2.3 | M | TLV | 9-n |  |  |
| 17 | GSM RR/UTRAN RRC State | GSM RR/UTRAN RRC State 11.2.17 | M | TLV | 3 |  |  |
| 6 | Coverage Indication | GERAN/UTRAN coverage Indicator 11.2.6 | M | TLV | 3 |  |  |
| 4 | GERAN Cell Identity | GERAN Cell Identity 11.2.4 | C | TLV | 4 |  |  |
| 5 | Location Area Identification | Location Area Identification 11.2.5 | C | TLV | 7 |  |  |
| 41 | Routing Area Code | Routing Area Code 11.2.41 | C | TLV | 3 |  |  |
| 8 | Geographic Location | Geographical Location 11.2.8 | O | TLV | 9-n |  |  |

TABLE 1-continued

Content of GA-RC REGISTER REQUEST message

| IEI | Information Element | Type/Reference | Presence | Format | Length | Value | Notes |
|---|---|---|---|---|---|---|---|
| 42 | AP location | AP Location 11.2.42 | O | TLV | 7-n | | |
| 21 | Register Reject Cause | Register reject Cause 11.2.21 | C | TLV | 3 | | |
| 11 | Redirection Counter | Redirection Counter 11.2.11 | C | TLV | 3 | | |
| 9 | Last GANC-SEGW IP address | IP Address 11.2.9 | C | TLV | 7-19 | | |
| 10 | Last GANC-SEGW FQDN | Fully Qualified Domain/Host Name 11.2.10 | C | TLV | 5-258 | | |
| 97 | Last GANC IP address | IP Address 11.2.9 | C | TLV | 7-19 | | |
| 98 | Last GANC FQDN | Fully Qualified Domain/Host Name 11.2.10 | C | TLV | 5-258 | | |
| 61 | AP Service Name | AP Service Name 11.2.61 | C | TLV | 4-260 | | |
| 68 | Registration indicators | Registration Indicators 11.2.68 | C | TLV | 3 | | |
| 69 | GAN PLMN List | GAN PLMN List 11.2.69 | C | TLV | n | | |
| 71 | Required GAN Services | Required GAN Services 11.2.71 | O | TLV | 3 | | |
| 73 | 3G Cell Identity | 3G Cell Identity 11.2.73 | C | TLV | 6 | | |
| 82 | 3G UARFCN | 3G UARFCN 11.2.82 | O | TLV | 4 | | |
| 74 | 3G Security Capability | 3G Security Capability 11.2.111 | C | TLV | 6 | | |

As shown in Table 1, the example GA-RC REGISTER REQUEST message 502 may include some information elements that provide the GANC 104 with information related to the physical location of the mobile station 102. These information elements may include, for example, geographic location (IE [8]), AP location (IE [42]), and/or a cellular radio access network identity (IE [4], IE [73]).

Upon receipt of the registration request (e.g., the GA-RC REGISTER REQUEST message 502), the GANC 104 determines that the registration should be accepted (if applicable), encodes a time zone offset and a universal time in an information element, and sends a registration acceptance (e.g., a GA-RC REGISTER ACCEPT message 508), which includes the information element, to the mobile station 102. For example, Table 2 illustrates an example format for a GS-RC REGISTER ACCEPT message 508 that includes the Time Zone and Time information element.

TABLE 2

Content of GA-RC REGISTER ACCEPT message with Time Zone and Time

| IEI | Information Element | Type/Reference | Presence | Format | Length | Value | Notes |
|---|---|---|---|---|---|---|---|
| | Length Indicator | Length Indicator 11.1.1.1 | M | V | 2 | | |
| | GA-RC Protocol Discriminator | Protocol Discriminator 11.1.1.2 | M | V | ½ | 0000 | |
| | Skip Indicator | Skip Indicator 11.1.1.3 | M | V | ½ | 0000 | |
| | GA-RC REGISTER ACCEPT message identity | Message Type 11.1.1.4 | M | V | 1 | | |
| 4 | Cell Identity | Cell Identity 11.2.4 | M | TLV | 4 | | |
| 5 | Location Area Identification | Location Area Identification 11.2.5 | M | TLV | 7 | | |
| 14 | GAN Control Channel Description | GAN Control Channel Description 11.2.14 | M | TLV | 8 | | |

TABLE 2-continued

Content of GA-RC REGISTER ACCEPT message with Time Zone and Time

| IEI | Information Element | Type/Reference | Presence | Format | Length | Value | Notes |
|---|---|---|---|---|---|---|---|
| 23 | TU3910 Timer | TU3910 Timer 11.2.23 | M | TLV | 4 | | |
| 22 | TU3906 Timer | TU3906 Timer 11.2.22 | M | TLV | 4 | | |
| 19 | GAN Band | GAN Band 11.2.19 | M | TLV | 3 | | |
| 37 | TU3920 Timer | TU3920 Timer 11.2.37 | M | TLV | 4 | | |
| 13 | GAN Cell Description | GAN Cell Description 11.2.13 | O | TLV | 4 | | |
| 43 | TU4001 Timer | TU4001 Timer 11.2.43 | C | TLV | 4 | | |
| 60 | TU4003 Timer | TU4003 Timer 11.2.60 | C | TLV | 4 | | |
| 44 | Location Status | Location Status 11.2.44 | O | TLV | 3 | | |
| 62 | GAN Service Zone Information | GAN Service Zone Information 11.2.62 | O | TLV | 5-133 | | |
| 67 | Serving GANC table indicator | Serving GANC table indicator 11.2.67 | O | TLV | 3 | | |
| 112 | TU4004 Timer | TU4004 Timer 11.2.78 | C | TLV | 3 | | |
| 79 | GAN Mode Indicator | GAN Mode Indicator 11.2.79 | O | TLV | 3 | | |
| 81 | GAN Iu Mode Cell Description | GAN Iu Mode Cell Description 11.2.81 | O | TLV | 6 | | |
| 129 | Handover Reporting Control | Handover Reporting Control 11.2.113 | O | TLV | 4 | | |
| 130 | Time Zone and Time | Time Zone and Time 11.2.114 | O | TV | 8 | | |

If the Time Zone and Time information element (IE [130]) is present and the mobile station 102 supports NITZ functionality (e.g., as defined in 3GPP TS 22.042, the entirety of which is hereby incorporated by reference), the mobile station 102 uses the Time Zone and Time information in the information element instead of Time Zone and Time information provided by the serving PLMN (e.g., PLMN A 106) (e.g., as defined in 3GPP TS 24.008, the entirety of which is hereby incorporated by reference).

A registration update (e.g., a GA-RC REGISTER UPDATE DOWNLINK message 510) may be sent at some time during the example message flow 500. The registration update may update system settings on the mobile station 102 to provide GAN connection information. Table 3 illustrates an example format for a GA-RC REGISTER UPDATE DOWNLINK message 510. Like the example GA-RC REGISTER ACCEPT message 508, the example a GA-RC REGISTER UPDATE DOWNLINK message 510 may include a Time Zone and Time information element.

TABLE 3

Content of GA-RC REGISTER UPDATE DOWNLINK message with Time Zone and Time

| IEI | Information Element | Type/Reference | Presence | Format | Length | Value | Notes |
|---|---|---|---|---|---|---|---|
| | Length Indicator | Length Indicator 11.1.1.1 | M | V | 2 | | |
| | GA-RC Protocol Discriminator | Protocol Discriminator 11.1.1.2 | M | V | ½ | 0000 | |
| | Skip Indicator | Skip Indicator 11.1.1.3 | M | V | ½ | 0000 | |
| | GA-RC REGISTER UPDATE DOWNLINK message identity | Message Type 11.1.1.4 | M | V | 1 | | |
| 4 | Cell Identity | Cell Identity 11.2.4 | O | TLV | 4 | | |

TABLE 3-continued

Content of GA-RC REGISTER UPDATE DOWNLINK message with Time Zone and Time

| IEI | Information Element | Type/Reference | Presence | Format | Length | Value | Notes |
|---|---|---|---|---|---|---|---|
| 5 | Location Area Identification | Location Area Identification 11.2.5 | O | TLV | 7 | | |
| 14 | GAN Control Channel Description | GAN Control Channel Description 11.2.14 | O | TLV | 8 | | |
| 23 | TU3910 Timer | TU3910 Timer 11.2.23 | O | TLV | 4 | | |
| 22 | TU3906 Timer | TU3906 Timer 11.2.22 | O | TLV | 4 | | |
| 19 | GAN Band | GAN Band 11.2.19 | O | TLV | 3 | | |
| 37 | TU3920 Timer | TU3920 Timer 11.2.37 | O | TLV | 4 | | |
| 13 | GAN Cell Description | GAN Cell Description 11.2.13 | O | TLV | 4 | | |
| 43 | TU4001 Timer | TU4001 Timer 11.2.43 | O | TLV | 4 | | |
| 60 | TU4003 Timer | TU4003 Timer 11.2.60 | O | TLV | 4 | | |
| 44 | Location Status | Location Status 11.2.44 | O | TLV | 3 | | |
| 62 | GAN Service Zone Information | GAN Service Zone Information 11.2.62 | O | TLV | 5-133 | | |
| 81 | GAN Iu Mode Cell Description | GAN Iu Mode Cell Description 11.2.81 | O | TLV | 6 | | |
| 130 | Time Zone and Time | Time Zone and Time 11.2.114 | O | TV | 8 | | |

Table 4 illustrates an example format for the Time Zone and Time information element.

TABLE 4

Contents of example Time Zone and Time information element

| 8 | 7 | 6 | 5 | 4 | 3 | 2 | 1 | |
|---|---|---|---|---|---|---|---|---|
| | | | Time Zone and Time IEI | | | | | octet 1 |
| | | | Year | | | | | octet 2 |
| | | | Month | | | | | octet 3 |
| | | | Day | | | | | octet 4 |
| | | | Hour | | | | | octet 5 |
| | | | Minute | | | | | octet 6 |
| | | | Second | | | | | octet 7 |
| | | | Time zone | | | | | octet 8 |

Referring to Table 4, the example Year field (e.g., octet 2, bits 1-8) uses the same format as the Year field used in the TP-Service-Centre-Time-Stamp, which is defined in 3GPP TS 23.040 IE [90], and its value is set as defined in 3GPP TS 22.042 IE [89]. The entirety of 3GPP TS 23.040 is hereby incorporated by reference. The example Month field (e.g., octet 3, bits 1-8) uses the same format as the Month field used in the TP-Service-Centre-Time-Stamp, which is defined in 3GPP TS 23.040 IE [90], and its value is set as defined in 3GPP TS 22.042 IE [89]. The example Day field (octet 4, bits 1-8) uses the same format as the Day field used in the TP-Service-Centre-Time-Stamp, which is defined in 3GPP TS 23.040 IE [90], and its value is set as defined in 3GPP TS 22.042 IE [89]. The example Hour field (e.g., octet 5, bits 1-8) uses the same format as the Hour field used in the TP-Service-Centre-Time-Stamp, which is defined in 3GPP TS 23.040 IE [90], and its value is set as defined in 3GPP TS 22.042 IE [89]. The example Minute field (e.g., octet 6, bits 1-8) uses the same format as the Minute field used in the TP-Service-Centre-Time-Stamp, which is defined in 3GPP TS 23.040 IE [90], and its value is set as defined in 3GPP TS 22.042 IE [89]. The example Second field (e.g., octet 7, bits 1-8) uses the same format as the Second field used in the TP-Service-Centre-Time-Stamp, which is defined in 3GPP TS 23.040 IE [90], and its value is set as defined in 3GPP TS 22.042 IE [89].

The example Time Zone field (e.g., octet 8, bits 1-8) uses the same format as the Time Zone field used in the TP-Service-Centre-Time-Stamp, which is defined in 3GPP TS 23.040 IE [90], and its value is set as defined in 3GPP TS 22.042 IE [89]. In some examples, the Time Zone part of the Time Zone and Time information element encodes the offset between universal time (e.g., UTC) and the local time of the mobile station 102 in steps of 15 minutes. However, other steps may additionally or alternatively be used to encode the time zone in the information element. The time part of the Time Zone and Time information element (e.g., the Year, Month, Day, Hour, Minute, and Second fields) is to encode the universal time at which the information element may be sent or may have been sent by the network.

The PLMN A 106 also transmits MM Time Zone and Time information 512 to the mobile station 102, which is transparently passed via the GANC 104. As mentioned above, however, the Time Zone and Time information 512 may not accurately reflect the local time zone in which the mobile station 102 is located. The PLMN A 106 may provide the Time Zone and Time information 512 to the mobile station 102 at any time after the mobile station 102 is connected. Accordingly, the mobile station 102 determines which Time Zone and Time information to use 514 to provide the user with the correct local time. The example message flow 500 may then end.

Figure 6:
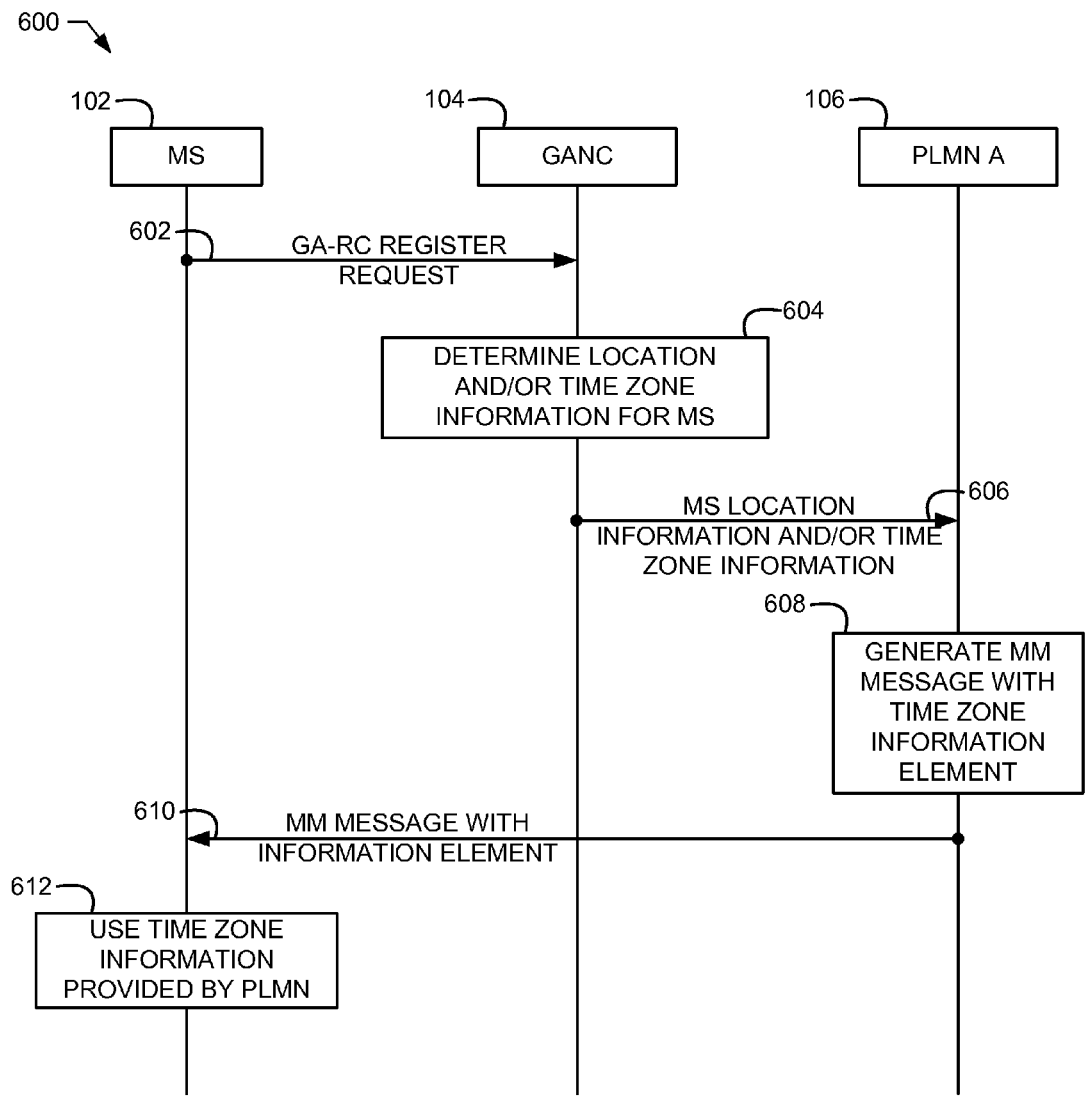
FIG. 6 is another example message flow to provide a mobile station with time zone information.

FIG. 6 is another example message flow 600 to provide the example mobile station 102 of FIG. 1 with time zone information. The message flow 600 occurs between the mobile station 102, the GANC 104, and the PLMN A 106 of FIG. 1. The example message flow 600 begins when the mobile station 102 is to initiate communication with the GANC 104 to, for example, request registration and/or access to the PLMN A 106 via the GANC 104. The mobile station 102 sends a registration request (e.g., a GA-RC REGISTER REQUEST message 602) to the GANC 104. For example, a GA-RC REGISTER REQUEST message 602 may be sent in accordance with 3GPP TS 44.318 and/or as described above in Table 1.

On receiving the GA-RC REGISTER REQUEST message 602, the GANC 104 determines location and/or time zone information 604 for the mobile station 102. As described above, the GANC 104 may determine the location of the mobile station 102 based on information elements provided in the GA-RC REGISTER REQUEST message 602, such as a cellular radio access network identity, an AP location, a geographic location, and/or from information determined by the security gateway 302, such as an outer IP address for an IPSec tunnel connecting the GANC 104 and the mobile station 102. The GANC 104 may further use the location information to determine a time zone in which the mobile station 102 is located. For example, the mobile station location determiner 304 may perform a lookup in the location database 306 to determine a time zone as described above. In some other examples, the GANC 104 may provide the received location information (e.g., the cellular radio access network identity, the AP location, the geographic location, and/or the outer IP address) to the PLMN A 106. In general, the PLMN A 106 does not have access to the AP location or the outer IP address without receiving such information from the GANC 104. While the PLMN A 106 may have access to the cellular radio access network identity and/or the geographic location, this information may not always be available (e.g., if the mobile station 102 is indoors and not near a macro cell).

After determining the location and/or the time zone of the mobile station 102, the GANC 104 autonomously provides the location and/or time zone information 606 to the PLMN A 106. Based on the location information and/or the time zone information, the PLMN A 106 (e.g., via a mobility manager) generates an MM or GMM message including time zone information 608 (e.g., a Time Zone and Time information element IE [130]). The example MM message may be generated in accordance with 3GPP TS 24.008. For example, if the PLMN A 106 receives location information for the mobile station 102 from the GANC 104, the PLMN A 106 may perform a database lookup to determine a time zone of the mobile station 102 based on the location information, and update a PLMN A 106 database with a time zone for the mobile station 102. For example, the NITZ system may be extended at the PLMN A 106 to determine a local time zone of the mobile station 102 using geographic location information and/or an outer IP address. In another example, the PLMN A 106 may receive a time zone (e.g., an offset from UTC) for the mobile station 102 from the GANC 104, in which case the PLMN A 106 may update a database with the time zone for the mobile station 102 without further processing. The MM or GMM message includes accurate time zone information because the PLMN A 106 is updated by the GANC 104 with the correct location and/or time zone of the mobile station 102.

The PLMN A 106 then sends the MM or GMM message with the information element 610 to the mobile station 102. The mobile station 102 uses the time zone information 612 provided by the PLMN A 106 to, for example, set a clock to a local time. Accordingly, the mobile station 102 may use its existing NITZ functionality and/or (G)MM messaging to receive and use the Time Zone information element from the mobility manager message 610.

Figure 7:
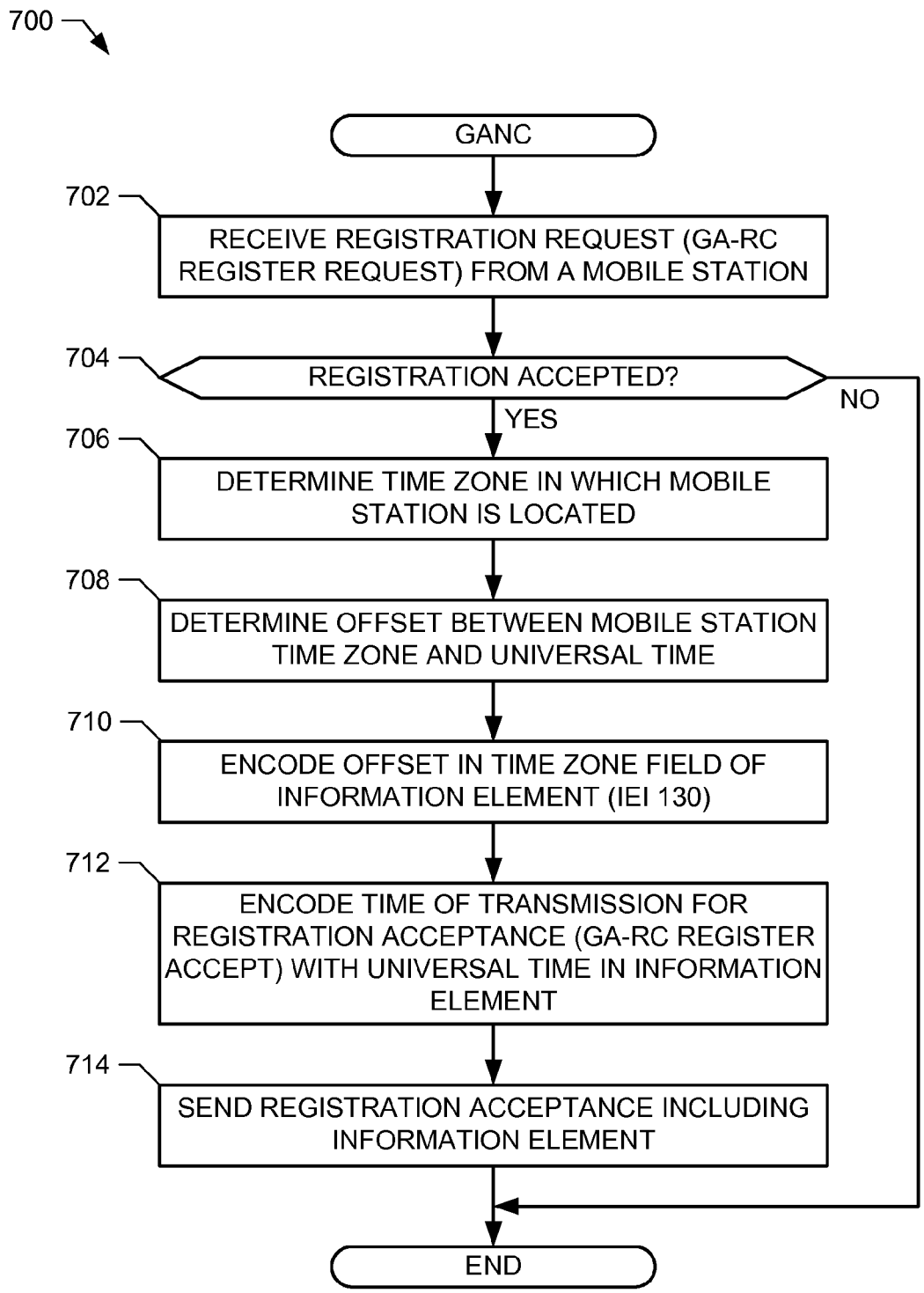
FIG. 7 is a flowchart of an example process that may be implemented using the generic access network controller of FIG. 1.
Figure 8:
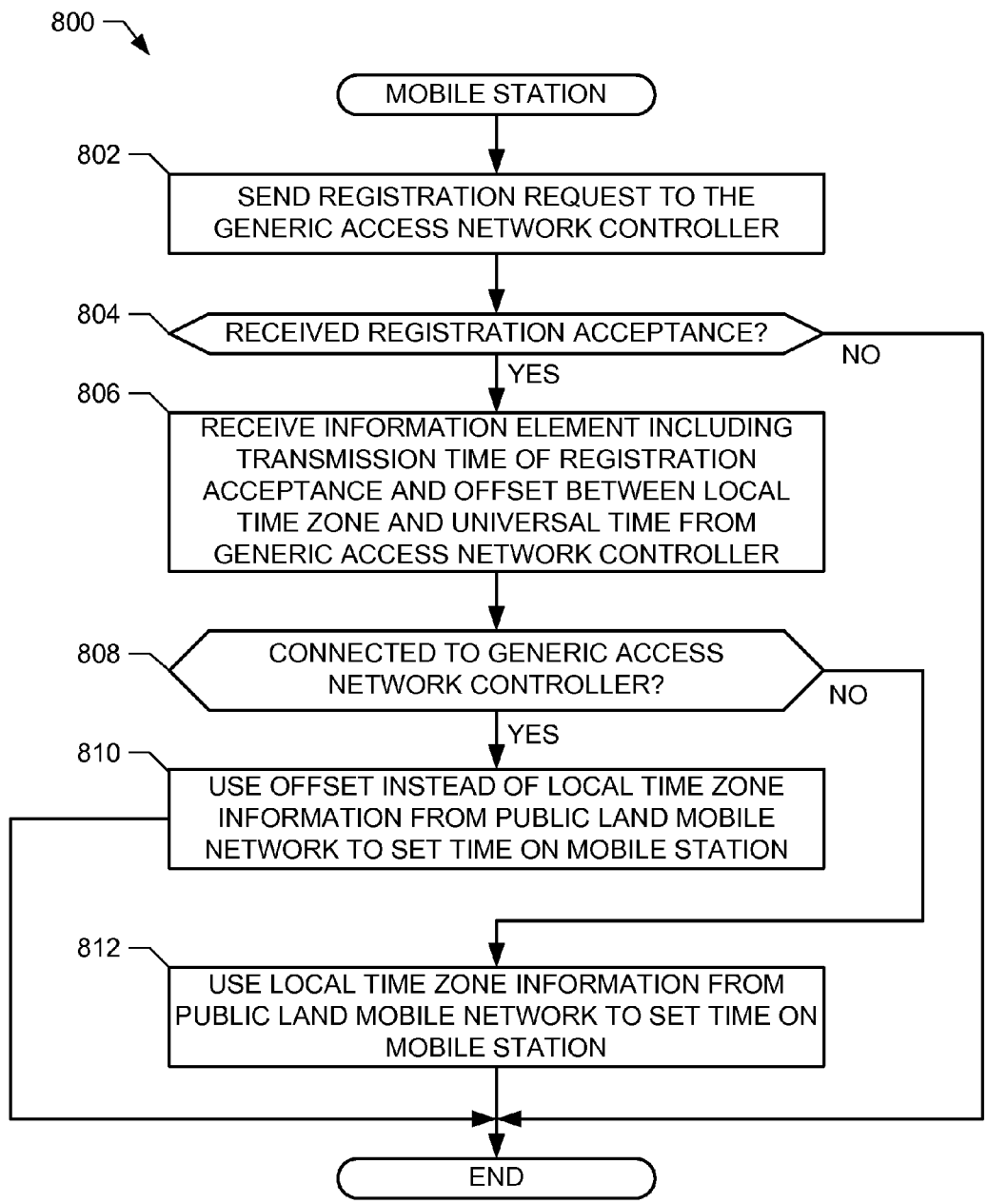
FIG. 8 is a flowchart of an example process that may be implemented using the mobile station of FIG. 1.
Figure 9:
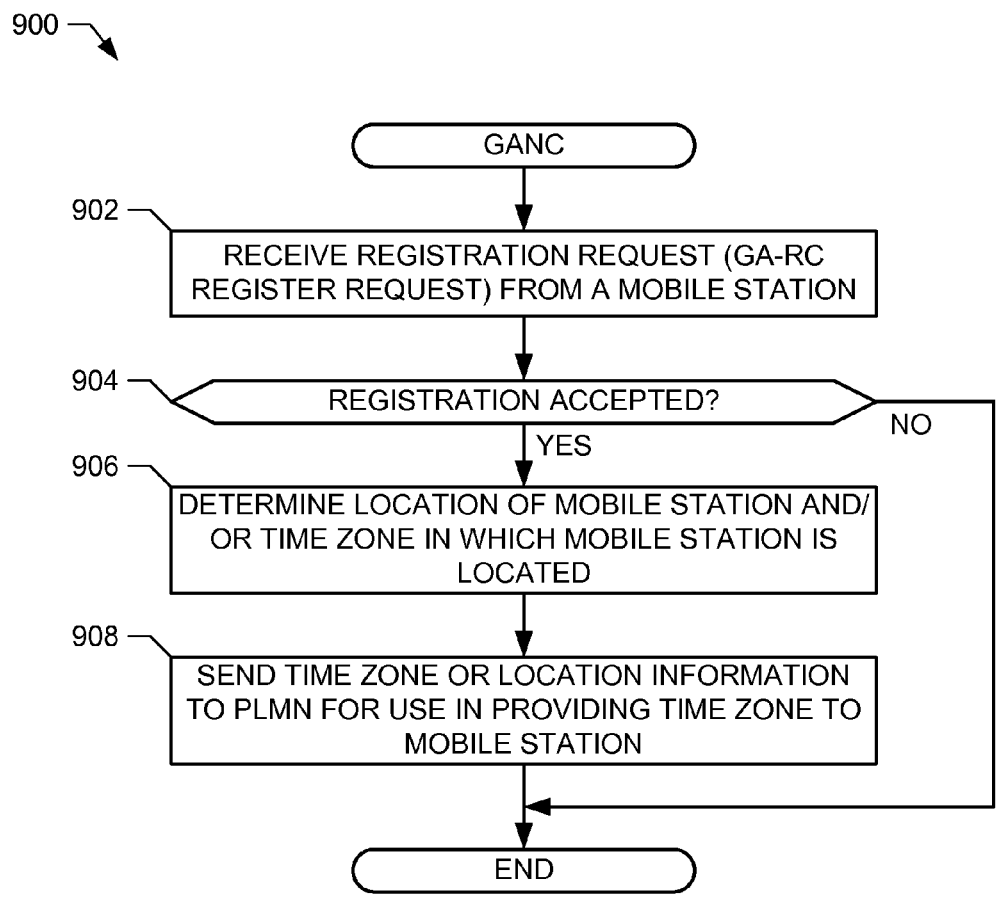
FIG. 9 is a flowchart of another example process that may be implemented using the generic access network controller of FIG. 1.

Flowcharts representative of example processes that may be executed to implement some or all of the elements of the system 100, the mobile station 102, the GANC 104, the PLMN A 106, and/or the message flows 500-600 are described herein are shown in FIGS. 7-9.

In these examples, the process represented by each flowchart may be implemented by one or more programs comprising machine readable instructions for execution by: (a) a processor, such as the microprocessor 1012 shown in the example computer 1000 discussed below in connection with FIG. 10, (b) a controller such as the controller 126 of FIG. 1, and/or (c) any other suitable device. The one or more programs may be embodied in software stored on a tangible medium such as, for example, a flash memory, a CD-ROM, a floppy disk, a hard drive, a DVD, or a memory associated with the processor 1012, but the entire program or programs and/or portions thereof could alternatively be executed by a device other than the microprocessor 1012 and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example mobile communications system components could be implemented by any combination of software, hardware, and/or firmware. Also, some or all of the processes represented by the flowcharts of FIGS. 7-9 may be implemented manually.

Further, although the example processes are described with reference to the flowcharts illustrated in FIGS. 7-9, many other techniques for implementing the example methods and apparatus described herein may alternatively be used. For example, with reference to the flowcharts illustrated in FIGS. 7-9, the order of execution of the blocks may be changed, and/or some of the blocks described may be changed, eliminated, combined, and/or subdivided into multiple blocks.

The example flowcharts of FIGS. 7-9 are described with reference to a registration acceptance and a GA-RC REGISTER ACCEPT message. However, the example processes described in the flowcharts may be modified to use other types of registration messages such as, for example, GA-RC REGISTER UPDATE DOWNLINK messages.

FIG. 7 is a flowchart of an example process 700 that may be implemented by the GANC 104. The example flowchart of FIG. 7 begins when the GANC 104 receives a registration request (e.g., the GA-RC REGISTER REQUEST message 502 of FIG. 5) (block 702). The GANC 104 then determines whether to accept the registration (block 704). If the registration is accepted (block 704), the GANC 104 determines (e.g., via the mobile station location determiner 304 of FIG. 3) a time zone in which the mobile station 102 is located (block 706). For example, the mobile station location determiner 304 may determine a physical location, or approximate physical location, of the mobile station 102 and map the physical location to a time zone. The mobile station location determiner 304 may determine the physical location by, for example, accessing the location database 306 of FIG. 3 to perform a time zone lookup by a geographical location of the mobile station 102 (e.g., provided by the mobile station 102 in the GA-RC REGISTER REQUEST message 502), by a location of an access point (e.g., provided by the mobile station 102 in the GA-RC REGISTER REQUEST message 502) used by the mobile station 102 to connect to the GANC 104, by a cellular radio access network identity (e.g., provided by the mobile station 102 in the GA-RC REGISTER REQUEST message) in which the mobile station 102 is located, and/or by an outer IP address of an IP security tunnel (e.g., provided by the security gateway 302) through which the mobile station 102 connects to the security gateway 302.

The example GANC 104 then determines an offset between the time zone in which the mobile station 102 is located and universal time (e.g., UTC) (block 708). The GANC 104 encodes the offset in the Time Zone field (e.g., octet 8) of a Time Zone and Time information element (e.g., IE [130]) (block 710). For example, the time zone encoding may be performed as defined by the TP-Service-Centre-Time-Stamp as defined in 3GPP TS 23.040 IE [90], and its value is set as defined in 3GPP TS 22.042 IE [89]. The GANC 104 further encodes a universal time at which a registration acceptance (e.g., a GA-RC REGISTER ACCEPT message) may be transmitted, where the registration acceptance includes the Time Zone and Time information element (block 712). For example, the time encoding may be performed using one or more of the Year, Month, Day, Hour, Minute, and/or Second fields as defined in the TP-Service-Centre-Time-Stamp, which is defined in 3GPP TS 23.040 IE [90], and which has its value set as defined in 3GPP TS 22.042 IE [89].

The GANC 104 then sends the registration acceptance (e.g., a GA-RC REGISTER ACCEPT message), including the Time Zone and Time information element having the encoded Time Zone and Time information, to the mobile station 102 (block 714). After sending the registration acceptance (block 714) and/or if the registration request is not accepted by the GANC 104 (block 704), the example process 700 may end.

FIG. 8 is a flowchart of an example process 800 that may be implemented by the mobile station 102. The example flowchart of FIG. 8 begins when the mobile station 102 sends a registration request (e.g., the GA-RC REGISTER REQUEST message 502 of FIG. 5) to the GANC 104 (block 802). At some time, the mobile station 102 determines whether a registration acceptance (e.g., the GA-RC REGISTER ACCEPT message 508 of FIG. 5) has been received (block 804). If the mobile station 102 determines that the registration acceptance was received (block 804), the mobile station 102 receives from the GANC 104 an information element (e.g., the Time Zone and Time information element) including a transmission time of the registration acceptance and an offset between a local time zone and universal time (block 806). In the illustrated example, the Time Zone and Time information element is received as an information element included as a part of the registration acceptance from the GANC 104.

The example mobile station 102 then determines whether it is connected to the GANC 104 from which it received the registration acceptance (block 808). For example, the mobile station 102 may have disconnected or deregistered from the GANC 104 if the mobile station 102 is handed off to a GERAN cell. If the mobile station 102 is still connected to the GANC 104 (block 808), the mobile station 102 uses the offset, instead of local time zone information from the hosting PLMN A 106, to set the local time on the mobile station 102 (block 810). On the other hand, if the mobile station 102 is no longer connected to the GANC 104, the mobile station 102 uses local time zone information provided by a PLMN B 112 to set the local time on the mobile station 102. After setting the local time (blocks 810 and 812), or if the registration was not accepted (block 804), the example process 800 may end.

FIG. 9 is a flowchart of another example process 900 that may be implemented by the GANC 104 of FIG. 1. The example process 900 may be performed to provide the mobile station 102 of FIG. 1 with time zone information via the PLMN A 106. The flowchart of FIG. 9 begins at block 902 when the GANC 104 receives a registration request (e.g., the GA-RC REGISTER REQUEST message 602 of FIG. 6). The registration request may include, for example a cellular radio access network identity, an AP location, and/or a geographic location of the mobile station 102. The GANC 104 determines if the registration is accepted (block 904).

If the registration is accepted (block 904), the GANC 104 determines location information and/or time zone information for the mobile station 102 (block 906). For example, the GANC 104 may determine location information and/or a time zone in which the mobile station is located based on location data, such as a cellular radio access network identity, an AP location, and/or a geographic location received from the registration request, and/or based on an IP address associated with an IPSec or other security tunnel connecting the GANC 104 and the mobile station 102. In another example, the GANC 104 may use the location data for transmission to the PLMN A 106 for determination of location and/or a time zone for the mobile station 102. After determining the location information and/or time zone for the mobile station 102 (block 906), the GANC 104 sends the time zone and/or the location information to the PLMN A 106 for use in providing the local time zone to the mobile station 102. As discussed above, the mobile station 102 may use existing NITZ functionality and (G)MM messaging to receive the time zone from the PLMN A 106. After providing the time zone and/or location information to the PLMN A 106 (block 908), or if the registration is not accepted (block 904), the example process 900 may end.

Figure 10:
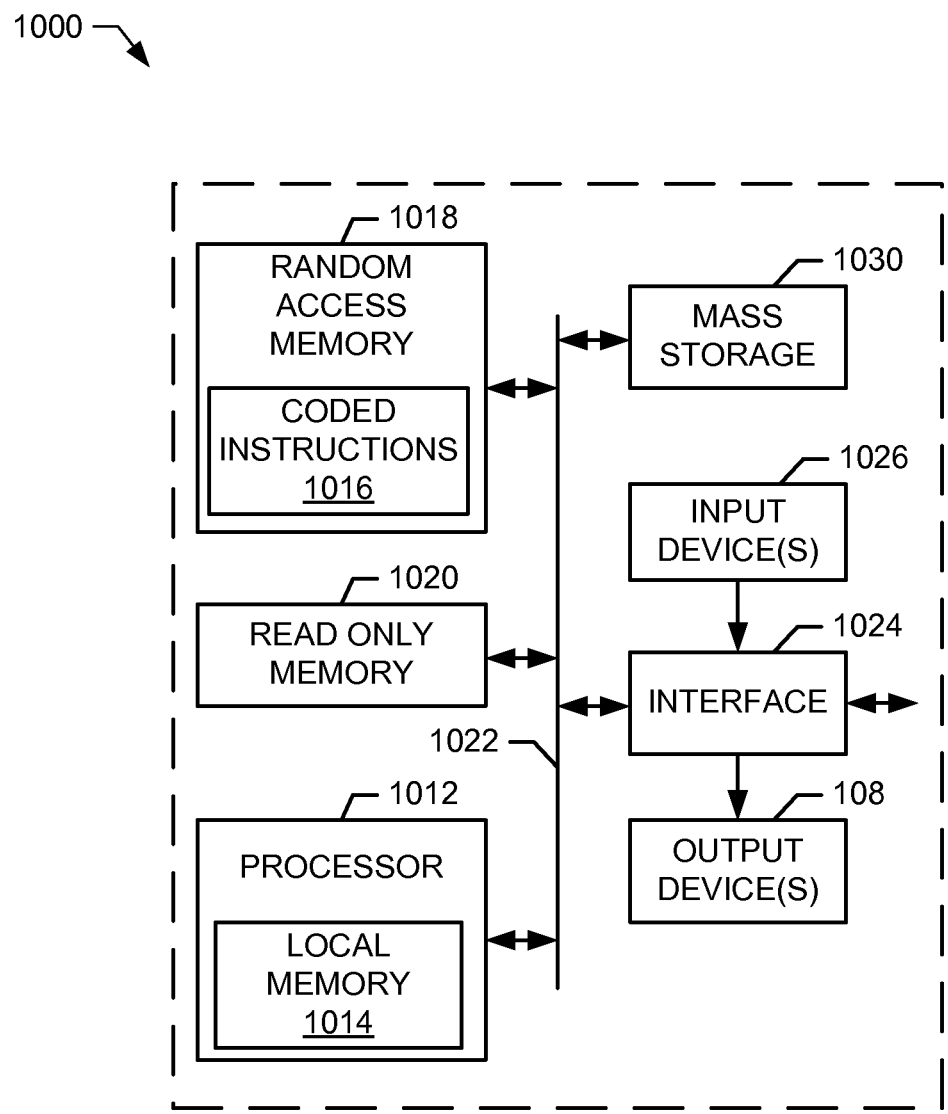
FIG. 10 is a block diagram of an example processing system capable of implementing the apparatus and methods disclosed herein.

FIG. 10 is a block diagram of an example processing system 1000 capable of implementing the apparatus and methods disclosed herein. The processing system 1000 can correspond to, for example, a mobile station processing platform, a network element processing platform, a server, a personal computer, a personal digital assistant (PDA), an Internet appliance, a mobile phone, or any other type of computing device. For example the processing system 1000 may implement the security gateway 302, the mobile station location determiner 304, the location database 306 and/or, more generally, the GANC 106, or any other component described herein.

The system 1000 of the instant example includes a processor 1012 such as a general purpose programmable processor, an embedded processor, a microcontroller, etc. The processor 1012 includes a local memory 1014, and executes coded instructions 1016 present in the local memory 1014 and/or in another memory device. The processor 1012 may execute, among other things, machine readable instructions to implement the processes represented in FIGS. 7-9. The processor 1012 may be any type of processing unit, such as one or more microprocessors from the Intel® Centrino® family of microprocessors, the Intel® Pentium® family of microprocessors, the Intel® Itanium® family of microprocessors, and/or the Intel® XScale® family of processors, one or more microcontrollers from the ARM® family of microcontrollers, the PIC® family of microcontrollers, etc. Of course, other processors from other families are also appropriate.

The processor 1012 is in communication with a main memory including a volatile memory 1018 and a non-volatile memory 1020 via a bus 1022. The volatile memory 1018 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory 1018, 1020 is typically controlled by a memory controller (not shown).

The system 1000 also includes an interface circuit 1024. The interface circuit 1024 may be implemented by any type of interface standard, such as an Ethernet interface, a universal serial bus (USB), and/or a third generation input/output (3GIO) interface.

One or more input devices 1026 are connected to the interface circuit 1024. The input device(s) 1026 permit a user to enter data and commands into the processor 1012. The input device(s) can be implemented by, for example, a keyboard, a mouse, a touchscreen, a track-pad, a trackball, an isopoint and/or a voice recognition system.

One or more output devices 1028 are also connected to the interface circuit 1024. The output devices 1028 can be implemented, for example, by display devices (e.g., a liquid crystal display, a cathode ray tube display (CRT)), by a printer and/or by speakers. The interface circuit 1024, thus, typically includes a graphics driver card.

The interface circuit 1024 also includes a communication device such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

The system 1000 also includes one or more mass storage devices 1030 for storing software and data. Examples of such mass storage devices 1030 include floppy disk drives, hard drive disks, compact disk drives, and digital versatile disk (DVD) drives.

As an alternative to implementing the methods and/or apparatus described herein in a system such as the device of FIG. 10, the methods and or apparatus described herein may be embedded in a structure such as a processor and/or an ASIC (application specific integrated circuit).

Finally, although certain example methods, apparatus and articles of manufacture have been described herein, the scope of coverage of this disclosure is not limited thereto. On the contrary, this disclosure covers all methods, apparatus and articles of manufacture fairly falling within the scope of the appended claims either literally or under the doctrine of equivalents.

What is claimed is:

1. A method, comprising:
accepting at a generic access network controller a registration request from a mobile station via an Internet protocol security tunnel connecting the generic access network controller to the mobile station via an Internet protocol network, the generic access network controller to communicatively couple the mobile station to a public land mobile network via the Internet protocol network;
determining a first time zone offset from a first time by looking up in a database an outer Internet protocol address of the Internet protocol security tunnel associated with an inner Internet protocol layer used by the mobile station to be addressed by the generic access network controller, the first time zone offset corresponding to a location of the mobile station;
encoding in a generic access network information element the first time zone offset from a first time; and
transmitting the generic access network information element in at least one of a GA-RC REGISTER ACCEPT message or a GA-RC REGISTER UPDATE DOWN-LINK message to the mobile station;
at the mobile station, receiving a second time zone offset from the first time sent by a second public land mobile network;
at the mobile station, automatically selecting the first time zone offset instead of the second time zone offset while connected to the generic access network controller; and
at the mobile station, setting a local time zone of the mobile station using the selected one of the first time zone offset or the second time zone offset.

2. A method as defined in claim 1, further comprising encoding a universal time at which the generic access network information element is transmitted.

3. A method as defined in claim 1, wherein the time zone offset comprises the local time zone relative to coordinated universal time (UTC).

4. A method as defined in claim 1, wherein the registration request from the mobile station further comprises at least one of an access point location or a geographic location.

5. A method as defined in claim 1, further comprising providing to the mobile station a mobility manager information element generated by the public land mobile network, the mobility manager information element including a second offset from the first time, wherein the time zone offset is to be used by the mobile station to determine a local time instead of the second offset.

6. A method as defined in claim 1, wherein the generic access network information element comprises at least an information element identifier field, an hour field, a minute field, a second field, and a time zone field and wherein the time zone field comprises an encoded difference between a first time zone and a second time zone.

7. A method as defined in claim 1, wherein the first time is UTC.

8. A method, comprising:
sending a generic access network registration request from a mobile station to a generic access network controller via an Internet protocol security tunnel connecting the generic access network controller to the mobile station via an Internet protocol network, the generic access network controller to communicatively couple the mobile station to a first public land mobile network via the Internet protocol network;
receiving at least one of a GA-RC REGISTER ACCEPT message or a GA-RC REGISTER UPDATE DOWN-LINK message from the generic access network controller, the at least one of the GA-RC REGISTER ACCEPT message or the GA-RC REGISTER UPDATE DOWN-LINK message comprising a first time zone offset corresponding to a location of the mobile station from a first universal time, the first offset determined by the generic access network controller by looking up in a database an outer Internet protocol address of the Internet protocol security tunnel associated with an inner Internet protocol layer used by the mobile station to be addressed by the generic access network controller, and the first offset being encoded in a generic access network information element;
receiving a second offset from the first universal time sent by a second public land mobile network; and
automatically selecting the first offset instead of the second offset while connected to the generic access network controller; and
setting a local time zone of the mobile station using the selected one of the first offset or the second offset.

9. A method as defined in claim 8, wherein the at least one of the GA-RC REGISTER ACCEPT message or the GA-RC REGISTER UPDATE DOWNLINK message further comprises the first universal time.

10. A method as defined in claim 9, further comprising receiving a second universal time from the second public land mobile network, and automatically selecting the first universal time while connected to the generic access network controller.

11. A method as defined in claim 9, further comprising determining a local time based on the first universal time and the first offset.

12. A method as defined in claim 8, wherein the generic access network registration request further comprises at least one of a cellular radio access network identity, an access point location, or a geographic location.

* * * * *